Figure 6:
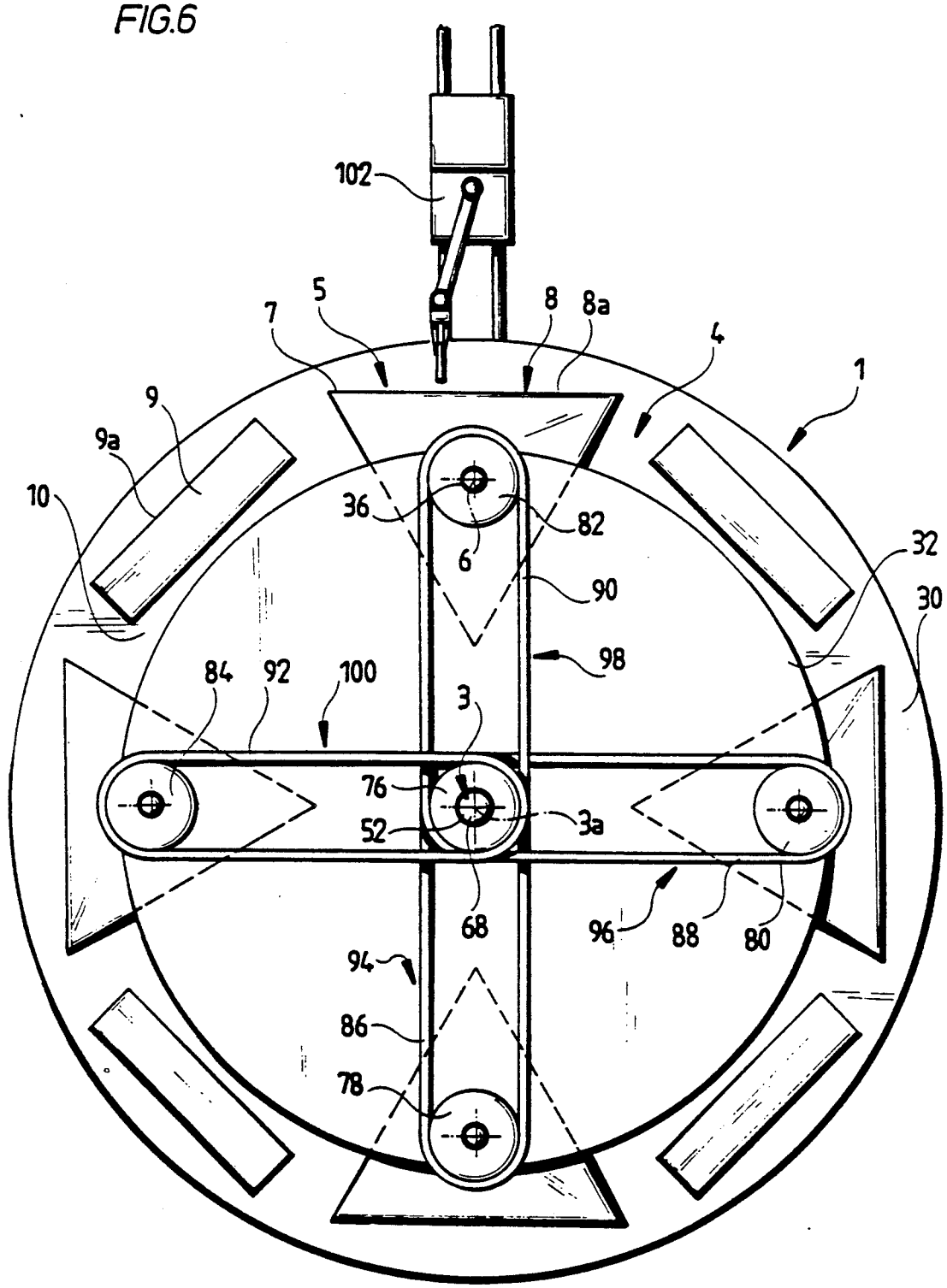

United States Patent [19]
Baur, deceased et al.

[11] Patent Number: 5,088,604
[45] Date of Patent: Feb. 18, 1992

[54] REVOLVING STORAGE FACILITY

[75] Inventors: Rolf Baur, deceased, late of Heubach-Lautern, by Helga Baur, heir; Joerg Linser, Heubach-Lautern; Herbert Grau; Manfred Bareis, both of Schwaebisch Gmuend; Wolfgang Bastek, Boebingen, all of Fed. Rep. of Germany

[73] Assignee: Grau Gmbh & Co., Schwaebish Gmuend, Fed. Rep. of Germany

[21] Appl. No.: 456,688

[22] Filed: Dec. 28, 1989

Related U.S. Application Data

[63] Continuation-in-part of Ser. No. 306,181, Feb. 6, 1989, abandoned, and Ser. No. 472,047, Dec. 28, 1989, abandoned.

[30] Foreign Application Priority Data

Dec. 30, 1988 [DE] Fed. Rep. of Germany ....... 3844303
Sep. 23, 1989 [DE] Fed. Rep. of Germany ....... 3931789
Dec. 11, 1989 [EP] European Pat. Off. ........ 89122803.3

[51] Int. Cl.$^5$ .............................................. A47F 3/08
[52] U.S. Cl. .................................. 211/1.5; 211/163
[58] Field of Search ................. 211/131, 163, 144, 1.5, 211/121; 312/251, 252, 305, 202, 11; 248/130, 131, 349.1

[56] References Cited
U.S. PATENT DOCUMENTS

| | | | |
|---|---|---|---|
| 729,642 | 6/1903 | Nash | 211/121 X |
| 2,512,465 | 6/1950 | Moorhouse | 211/1.5 X |
| 4,850,658 | 7/1989 | Sandor | 312/252 X |

Primary Examiner—Blair M. Johnson
Attorney, Agent, or Firm—Nixon & Vanderhye

[57] ABSTRACT

In order to improve a revolving storage facility for tape cassettes comprising a base and a rotary frame rotatable thereon about an axis of rotation and carrying shelf units with cassette compartments for tape cassettes such that the number of cassette compartments is increased while the space requirements is kept as small as possible, it is proposed that the rotary frame comprises a supporting frame which is rotatable about the axis of rotation relative to the base and on which subframes carrying the shelf units are mounted for rotation about subframe axes of rotation arranged sidewardly of the axis of rotation.

36 Claims, 4 Drawing Sheets

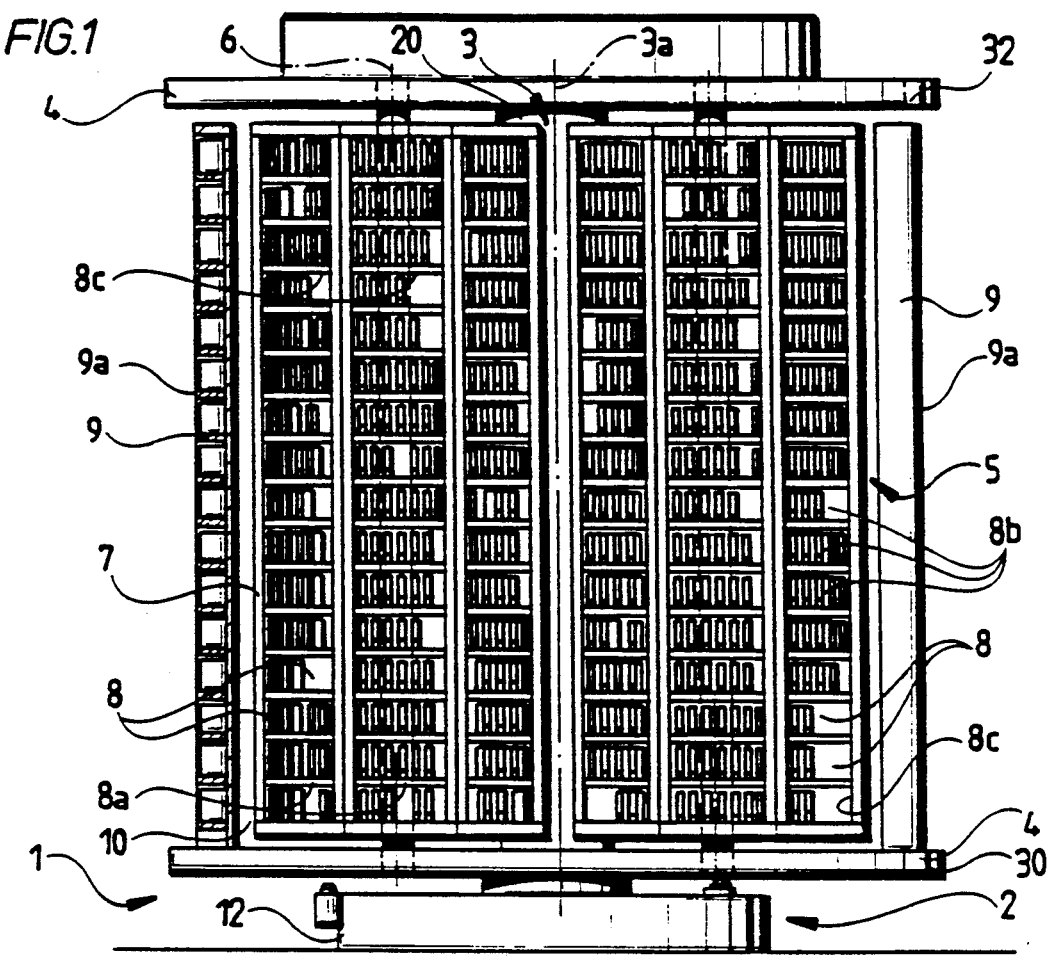
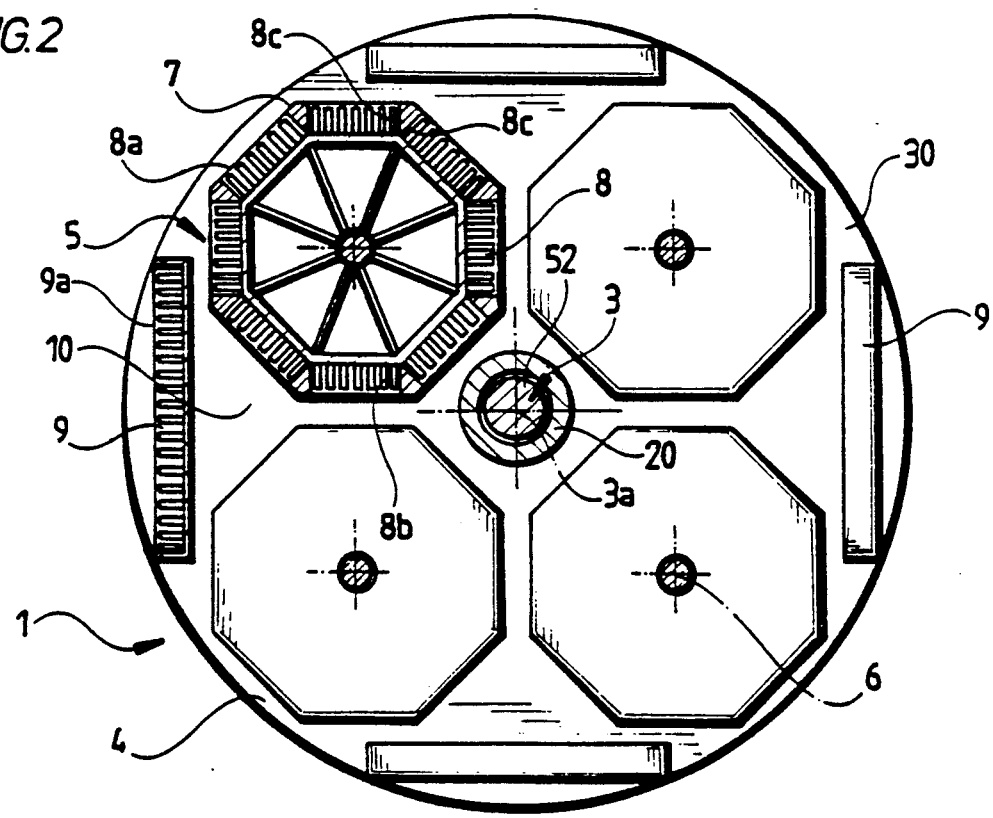

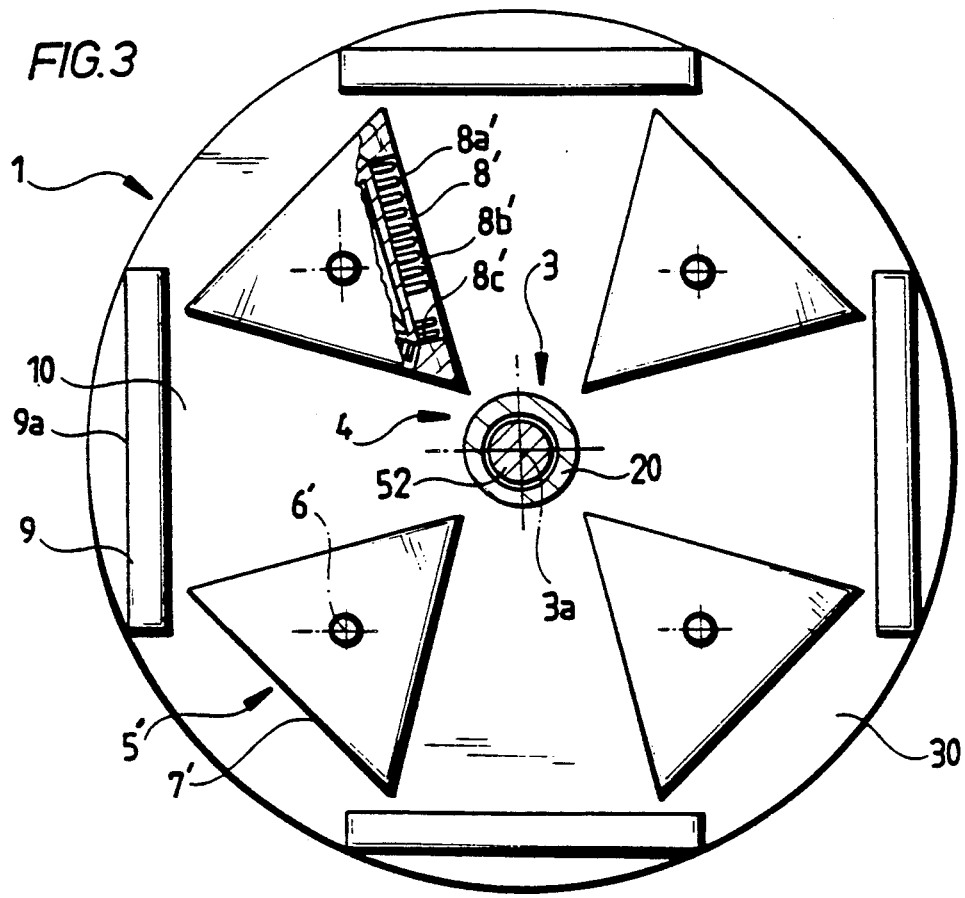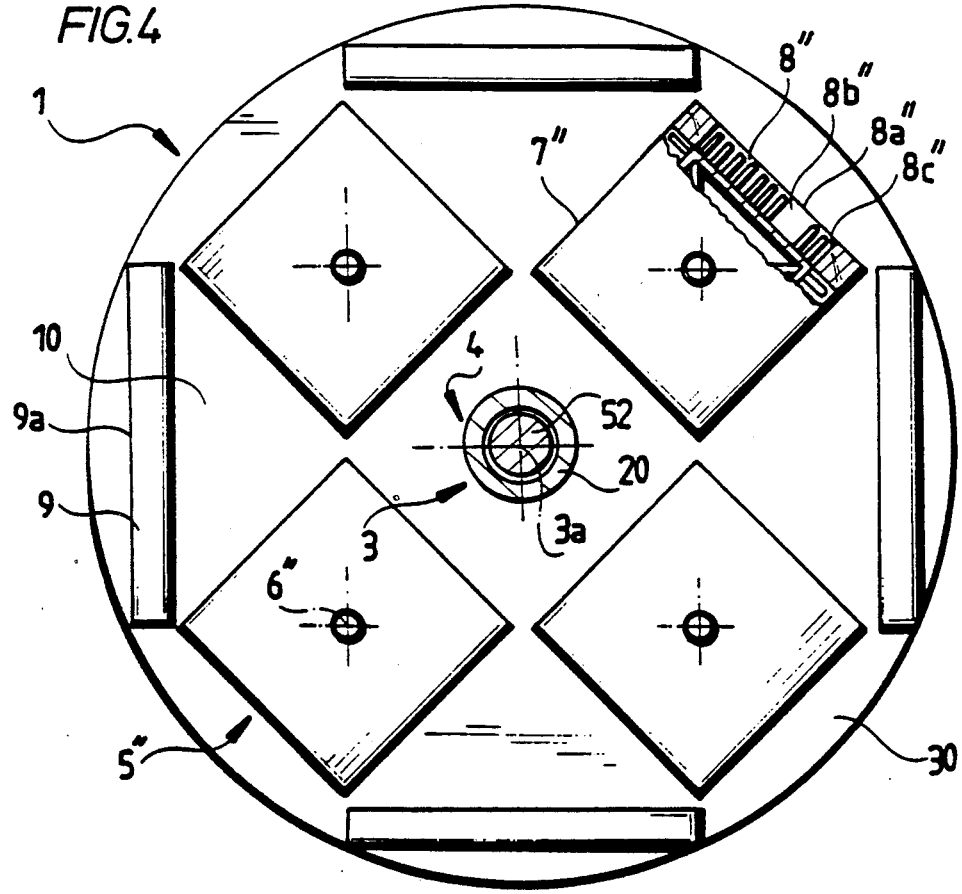

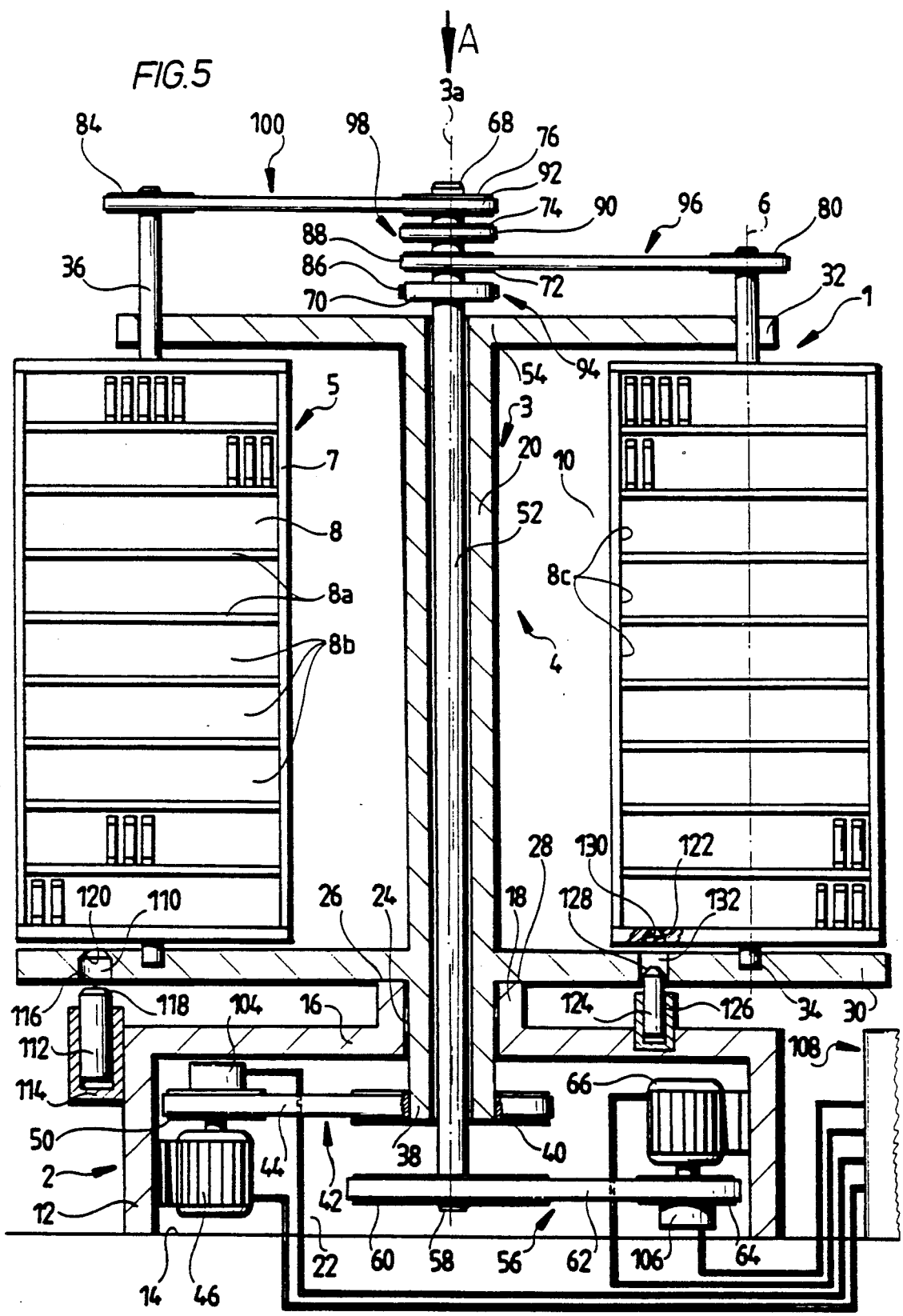

REVOLVING STORAGE FACILITY

CROSS-REFERENCE TO RELATED APPLICATIONS

This application is a continuation-in-part of commonly owned, copending U.S. application Ser. No. 07/306,181 filed on Feb. 6, 1989 in the name of Rolf Baur and entitled "Storage Units for Computer Tape Cassettes", and Ser. No. 472,047, both now abandoned, filed Dec. 28, 1989 in the name of the same inventors as the present application and entitled "Storage Units for Computer Tape Cassettes", and is related to commonly owned copending U.S. application Ser. No. 07/391,284, abandoned, filed on Aug. 9, 1989 in the name of Rolf Baur and entitled "Systems and Methods for the Automated Archiving and Retrieval of Computer Data Storage Cassettes", and Ser. No. 07/410,069, abandoned, filed on Sept. 21, 1989 in the name of Rolf Baur and entitled "Fully Automated System for Archiving and Retrieving Tapes", the entire content of each of the above-identified applications being expressly incorporated hereinto by reference.

The invention relates to a revolving storage facility for tape cassettes comprising a base and a rotary frame which is rotatable thereon about an axis of rotation and carries shelf units with cassette compartments for tape cassettes.

Storage shelves are used to store tape cassettes of large-scale computer systems. In accordance with their allocation, these storage shelves are provided with cassette compartments to enable filing of the tape cassettes in a defined position. Such shelves are preferably arranged in the immediate vicinity of tape units for reading and writing on the tape cassettes.

A storage facility for tape cassettes comprising a plurality of shelf units with cassette compartments rotatable about an axis is known from JP 61-11963A.

A disadvantage of these shelves is that the cassette compartments can only be arranged at the outer circumference of the shelf and so an increase in the number of cassettes per revolving storage facility results in an increase in the circumference.

The object underlying the invention is, therefore, to so improve a revolving storage facility of the generic kind that the number of cassette compartments is enlarged while the space requirement is kept as small as possible.

This object is accomplished in accordance with the invention in a revolving storage facility of the kind described at the beginning by the rotary frame comprising a supporting frame which is rotatable about the axis of rotation relative to the base and by subframes carrying the shelf units being mounted on the supporting frame for rotation about subframe axes of rotation arranged sidewardly of the axis of rotation.

With this advantageous design of the rotary frame with the subframes, the interior of a revolving storage facility is also put to optimal use and a larger storage capacity thereby created with low space requirement.

Owing to the subframes being of rotatable design, it is, furthermore, possible for each cassette compartment and hence each tape cassette deposited therein to be brought into a position in which a robot or an operator has quick access to it.

It is particularly advantageous for the axis of rotation to extend vertically upwardly from the base.

In a particularly expedient arrangement, the axis of rotation and the subframe axes of rotation extend parallel to one another.

Provision is advantageously made for the subframe axes of rotation to be arranged substantially vertically.

For optimum arrangement of the subframes, the subframe axes of rotation are expediently arranged equidistantly from the axis of rotation of the supporting frame.

An expedient arrangement of the subframes is, furthermore, achievable by the subframe axes of rotation being arranged at the same angular spacing about the supporting frame axis.

An advantageous arrangement of the shelf units on the subframes is possible, in particular, by each subframe carrying several shelf units which are arranged at an outer circumference of the subframe.

The shelf units preferably have a front face which forms one plane. Particularly expedient designs have a rectangular cross-section and preferably a parallelepipedlike shape. It is, furthermore, advantageous for the shelf units to have several horizontally extending rows of cassette compartments stacked one on top of the other. It is particularly expedient for the cassette compartments to be designed to accommodate tape cassettes standing on end.

In an expedient embodiment, the subframes have an outer circumferential surface which is of cylindrical, round configuration.

As an alternative to this, it is advantageous for the subframes to have an outer circumferential surface which is of three-sided cross-section, i.e., to have three faces.

It is, however, also conceivable for the subframes to have an outer circumferential surface of four-sided configuration, i.e., to have four faces.

Finally, it is conceivable for the subframes to have an outer circumferential surface of many-sided configuration.

In a preferred embodiment, the shelf units are module-like units of identical design which can be mounted on the subframes.

Since even with optimum arrangement of the subframes on the supporting frame, intermediate zones remain between the subframes and always only the cassette compartments of the shelf units whose front faces are oriented essentially at a tangent to a circular arc around the axis of rotation are accessible, it is advantageous, in order to increase the storage capacity, for further shelf units to be arranged in the intermediate zones formed between the subframes at an outer side of the supporting frame.

It is particularly expedient for the further shelf units to be held stationarily on the supporting frame.

To enable simple access to the different shelf units, provision is expediently made in a preferred embodiment for the front sides of the shelf units facing an outer side of the revolving storage facility to exhibit an essentially constant spacing from the axis of rotation of the supporting frame. This means that the front sides of the shelf units of the subframes and the front sides of the shelf units held directly on the supporting frame exhibit essentially the same radial spacing from the axis of rotation of the supporting frame so that independently of whether a shelf unit of a subframe or a shelf unit carried by the supporting frame is standing in a position suitable for access, these are arranged in the same geometrical position for a robot to have access thereto from the outside.

A supporting frame drive means is provided to enable simple access to the individual shelf units.

The supporting frame drive means is preferably designed so as to comprise a supporting frame drive motor which is arranged non-rotatingly relative to the base. This has the great advantage that power can be supplied to the supporting frame drive motor in the non-rotating system through stationary lines, which is most expedient, particularly in those cases where the supporting frame drive motors are stepper motors, as rotary leads for stepper motors always give rise to erroneous pulse numbers.

It is most expedient for the supporting frame to be driven via a connecting member which is arranged coaxially with the axis of rotation of the supporting frame and, in the simplest case, is a driving element of the supporting frame.

It is, furthermore, advantageous for a subframe drive means to be provided.

In one embodiment it is conceivable to allocate to each subframe a drive means of its own. This does, however, have the disadvantage that a plurality of independent drive means is necessary.

For this reason, an economical solution makes provision for several subframes to be driven by a common subframe drive means.

It is particularly advantageous for all subframes to be driven by a common subframe drive means so that only one drive means involving costs is required to drive all of the subframes simultaneously. This offers additional advantages as far as the control engineering is concerned because only one drive means has to be controlled.

It is also particularly expedient for the subframe drive means to comprise a subframe drive motor which is held non-rotatingly relative to the base, i.e., which can likewise be supplied by stationary feed lines, as this eliminates a major source of errors when stepper motors are used.

It is particularly expedient for the subframe drive motor to be arranged on the base.

The mechanical connection of the subframe drive means with the subframes is advantageously implemented by the subframe drive means comprising an intermediate drive member which is arranged coaxially with the axis of rotation of the supporting frame and preferably establishes a connection between the non-rotatingly arranged subframe drive motor and the subframes rotating with the supporting frame, i.e., enables transmission from the non-rotating to the rotating system. Structurally, this can be expediently solved by the subframe drive means comprising a central shaft which is arranged coaxially with the axis of rotation of the supporting frame and via which the individual subframes are driven.

In the most expedient case, the central shaft is driven by the subframe drive motor via a belt drive.

A solution wherein the subframes are driven from the central shaft is particularly expedient.

This is advantageously effected by each subframe comprising a subframe drive shaft which is coaxial with the subframe axis and is driven by the central shaft.

The connection between the subframe drive shaft and the central shaft is also advantageously effected by the central shaft driving each subframe drive shaft via a belt drive.

The belt drives are preferably arranged so that each belt drive lies in a plane perpendicular to the axis of rotation of the supporting frame.

Within the scope of the present invention, the belt drives can be arranged so as to lie on the side of the rotary frame facing the base. As far as the drive engineering is concerned, this has the advantage of proximity to the base.

It is, however, particularly expedient for the belt drives to be arranged between the central shaft and the subframe drive shaft on the side of the supporting frame located opposite the base.

It is particularly advantageous for the supporting frame to comprise a hollow shaft through which the central shaft extends.

The mounting of the supporting frame is expediently implemented by the hollow shaft being rotatably mounted on the base.

It is particularly advantageous for the base to comprise a self-supporting housing on which the supporting frame then rests.

A structurally simple possibility for driving the supporting frame makes provision for the hollow shaft to be driven via a belt drive included in the supporting frame drive means.

A solution which is of compact design with respect to the drive of the supporting frame and the subframes makes provision for the belt drive for driving the hollow shaft and the belt drive for driving the central shaft to be arranged in the base.

Provision is preferably made for one of the above-mentioned belt drives or all of the above-mentioned belt drives to operate with toothed belts.

For precise positioning of the supporting frame and the subframes, a control system is expediently provided to detect the rotary positions of the supporting frame and the subframes.

For this purpose, sensors are preferably provided on the individual drive trains and, in the most expedient case, are placed on the supporting frame drive motor and the subframe drive motor.

The control system is expediently designed so as to determine from the rotary positions of the supporting frame drive means and the subframe drive means the position of the individual shelf units carried by the subframes relative to an externally located fixed point.

Complementarily to detection of the rotary positions of the supporting frame and the subframes, a particularly preferred embodiment makes provision for the control system to control rotation of the supporting frame and possibly the subframe on the basis of the rotary positions of the supporting frame and the subframes in order to place a selected cassette compartment in a position in which a robot has access to it.

An embodiment of the control system has proven particularly advantageous wherein rotation of the subframes occurs during rotation of the supporting frame and so upon termination of the rotation of the supporting frame, rotation of the subframes is also essentially terminated.

With use of the control system, provision is made in a particularly preferred embodiment for rough positioning of the supporting frame and the subframe to be carried out with this control system.

Complementarily to rough positioning or even without rough positioning, an embodiment wherein it is particularly a question of precisely placing the cassette compartments in the accessible position comprises a device which precisely places the supporting frame in specified angular positions relative to the base and has first positioning elements arranged on the supporting frame and on the base.

In like manner, it is particularly advantageous for a device having second positioning elements arranged on the subframe and on the base to be provided for precisely positioning a subframe in specified angular positions relative to the base. The special advantage of this positioning of the subframe is that it is not carried out relative to the supporting frame but relative to the base so that when exact positioning of the supporting frame has likewise been carried out, both the latter and the subframe are precisely positioned relative to the base.

So far, no further details have been given as to the design of the positioning elements. A simple structural solution is preferred wherein the positioning elements have an angle which engages in a recess.

To enable exact positioning, for example, after rough positioning has been carried out, it is expedient for the locking bar or the recess or both to be provided with drive-in inclines which are designed so as to come into contact with one another in the roughly positioned accessible position and bring about relative displacement of the supporting frame or the subframe in relation to the base until these have reached their exact position.

The exact position of the supporting frame and the subframe relative to the base is preferably attained by the locking bar and the recess fitting together.

It is advantageous for the subframes to be arranged perpendicularly and equidistantly from the central axis of the rotary frame. At the same time, the subframes can be arranged at the same angular spacings from one another.

The subframes are arranged perpendicularly and centrically in relation to the central axis of the supporting frame so that the supporting frame is subjected to approximately the same stress at each point with respect to the pressures acting thereon.

Depending on the radii of the supporting frame and the subframes, between two and seven subframes can be arranged on a supporting frame. It is, however, preferable for four subframes to be arranged on a supporting frame.

This solution offers the advantage that in comparison with a rotary frame without subframes, in a rotary frame with four subframes of identical height approximately twice the number of tape cassetess can be accommodated than in the rotary frame having no subframes.

In embodiments of the invention, the subframes can have an outer circumference of cylindrically round, three-sided, four-sided or many-sided configuration, and several rectangular shelf units can be arranged at the circumference of each subframe.

The configuration of the subframes can vary from cylindrically round, three-sided, four-sided to many-sided with respect to their outer circumference. The choice of design will depend last but not least on the dimensions of the shelf units to be arranged in the subframe. The shelf units may be made of metal or of plastic. The shelf units are fixed in the subframes. All of the shelf units in a rotary frame have the same dimensions and can, if required, be easily exchanged, for example, after a crash.

In a preferred embodiment, it is possible for the respective subframe to be first brought into the desired operating position by turning the rotary frame and for the subframe to be subsequently or simultaneously turned by the further drive means into the position in which the required cassette is in a defined position for the robot or operator to have access to it.

In the case of failure of the driving means—which may be in the form of an electric motor—both the rotary frame and the subframes can be moved by hand. If the tape cassettes are filed in an orderly fashion, the revolving storage facility can always be easily operated by hand.

With a view to optimal accommodation of tape cassettes within the smallest space, it is particularly advantageous for further shelf units to be arranged at the outer circumference of the supporting frame in the intermediate zones formed by the subframes.

In the peripheral area of the rotary frame, the subframes mounted for rotation on the rotary frame create intermediate zones extending over an approximately triangular area.

Further shelf units are arranged in these free spaces—intermediate zones—so optimal use is made of the entire space in a rotary frame for accommodating tape cassettes.

Further features and advantages of the invention are to be found in the following description and the appended drawings of several embodiments. The drawings show:

FIG. 1—a side view of an inventive revolving storage facility;

FIG. 2—a plan view of an inventive revolving storage facility similar to that of FIG. 1 with shelf units additionally arranged on the supporting frame;

FIG. 3—a plan view of a further embodiment of an inventive revolving storage facility with four three-sided subframes and further shelf units in intermediate zones;

FIG. 4—a plan view of a further embodiment of an inventive revolving storage facility with four four-sided subframes and further shelf units in intermediate zones;

FIG. 5—a section through an axis of rotation of the supporting frame in a further embodiment similar to that of FIG. 3; and FIG. 6—a plan view of the embodiment of FIG. 5 in the direction of arrow A in FIG. 5.

A first embodiment of an inventive storage facility in the form of a revolving tower for tape cassettes, illustrated in FIG. 1, comprises a base designated in its entirety 2 with a rotary frame designated in its entirety 1 arranged thereon for rotation relative to the base 2.

A shaft 3 extending vertically upwardly from the base 2 and having the rotary frame 1 rotatably mounted thereon is preferably provided for this purpose.

The rotary frame 1 comprises a supporting frame 4 which is mounted for rotation on the shaft 3 and so a supporting frame axis 3a is identical with the axis of rotation of the shaft 3.

Several subframes 5 are mounted on the supporting frame 4 for rotation about their respective subframe axis 6 which is arranged in spaced relation to the supporting frame axis 3a.

In the preferred embodiment shown in FIG. 1, the supporting frame axis 3a and the subframe axis of rotation 6 are aligned parallel to each other and extend substantially vertically.

The subframes 5 extend essentially over the entire height of the supporting frame 4 along the shaft 3 and comprise a plurality of shelf units 8. In the embodiment shown in FIGS. 1 and 2, eight shelf units 8 are provided per subframe 5. Each of the shelf units 8 extends over the entire height of the respective subframe 5 along the respective subframe axis of rotation 6 and comprises a plurality of superimposed rows 8b of cassette compartments 8c in which the tape cassettes are insertable preferably on end.

As may be seen, in particular, from FIG. 2, the subframes 5 are arranged about the shaft 3 so that their subframe axes of rotation 6 exhibit the same radial spacing from the supporting frame axis 3a and that the spacings between successive subframe axes of rotation 6 are also identical.

The embodiment shown in FIG. 2 is identical with the embodiment shown in FIG. 1 as far as the arrangement of the subframes is concerned. In contrast therewith, it does, however, comprise in addition to the subframes 5 carrying the shelf units 8 further shelf units 9 which are arranged in intermediate zones 10 located between the subframes 5, preferably in such a way that they point with a front face 9a towards the outer side of the revolving tower storage facility and at least partly cover those shelf units 8 of the subframes 5 whose front faces 8a do not likewise point to the outer side of the revolving tower storage facility. In accordance with the definition used within the scope of this patent specification, it is always only those front faces 8a and 9a oriented at a tangent to a circular path extending around the supporting frame axis 3a that point towards the outer side of the revolving tower storage facility.

The shelf units 8 and 9 are preferably made of either metal or plastic. The shelf units 9 comprise in the same way as the shelf units 8 likewise superimposed rows of cassette compartments for tape cassettes standing vertically.

The shelf units 9 preferably likewise extend over the entire height of the supporting frame 4.

As mentioned above, the shelf units 8 are arranged on the subframes 5 so that the shelf units 8 of each subframe 5 form a cylinder which is coaxial with the subframe axis of rotation and has an outer circumferential surface of octagonal cross-section.

In contrast therewith, in the embodiments shown in FIGS. 3 and 4, the shelf units 8 are arranged on the subframes 5' and 5" so that these likewise form cylinders which are coaxial with the subframe axes of rotation 6' and 6" but these cylinders comprise outer circumferential surfaces 7' and 7" which are of triangular or rectangular cross-section and preferably have the shape of an isosceles triangle and a square, respectively.

Alternatively, the shelf units 8 may be designed so as to form a cylinder with an outer circumferential surface of round cross-section.

A preferred possibility for a drive means of such a revolving tower storage facility according to the invention is shown in FIGS. 5 and 6.

As may be seen in FIG. 5, the base 2 is designed so as to comprise side walls 12 rising substantially vertically from a floor surface 14 and standing thereon and a cover 16 extending substantially parallel to the floor surface 14. This cover 16 together with the side walls 12 is designed as a self-supporting housing on which the rotary frame designated in its entirety 1 rests. To accommodate the rotary frame 1, the cover 16 comprises a guide bushing 18 for a shaft 20 which extends through the guide bushing 18 and hence also through the cover 16 into an interior 22 of the base 2. The guide bushing 18 thus forms a radial bearing 24 for the shaft 20. The guide bushing 18, furthermore, forms with end faces 26 facing the rotary frame 1 an axial thrust bearing designated in its entirety 28 on which a bottom plate 30 of the supporting frame 4 rests. The bottom plate 30 is rotationally fixedly held on the shaft 20 likewise included in the supporting frame 4 and is preferably integrally formed on the latter.

The shaft 20 extends upwardly from the bottom plate 30 coaxially with the supporting frame axis 3a as far as a cover plate 32 of the supporting frame 4 which is oriented parallel to the bottom plate 30.

Between the bottom plate 30 and the cover plate 32, the subframes 5 extend with their subframe axes of rotation 6 oriented parallel to the supporting frame axis 3a. As may be seen from FIG. 6, the subframe axes of rotation 6 are arranged at the same radial spacing from the supporting frame axis 3a and lie in the corners of a square.

The subframes 5 are mounted in the bottom plate 30 by journals 34 which extend downwardly from the subframes 5 into the bottom plate 30 and are held in the latter by both a radial bearing and an axial thrust bearing and also by subframe drive shafts 36 which extend upwardly from the respective subframe 5 through the cover plate 32 and are held in the latter by a radial bearing.

Rotation of the supporting frame 4 is enabled by the shaft 20 carrying at its end 38 protruding into the interior 22 of the base 2 a drive wheel 40 which is part of a belt drive designated in its entirety 42 and comprising a belt 44 and a driven wheel 50 seated on a motor shaft of a supporting frame drive motor 46. A defined rotation of the supporting frame 4 can be achieved by activating the supporting frame drive motor 46.

In the embodiment shown in FIG. 5, the shaft 20 is designed as a hollow shaft with a central drive shaft 52 extending through it and thereby protruding beyond the bottom end 38 of the shaft 20 and a top end 54 of the shaft 20.

The central drive shaft 52 is also driven via a belt drive designated in its entirety 56 which comprises a drive wheel 60 seated at a bottom end 58 of the central drive shaft, a belt 62 and a driven wheel 64 seated on a motor shaft of a subframe drive motor 66. On its end section 68 protruding beyond the supporting frame 4, in particular its cover plate 32, the central drive shaft 52 carries a plurality of superimposed driven wheels 70, 72, 74 and 76. Each of these driven wheels 70 to 76 is driven by one of the drive wheels 78, 80, 82 and 84 via a belt 86, 88, 90 and 92.

The precondition of this is that the subframe drive shafts 36 of the individual subframes 5 be prolonged so far that the drive wheels 78 to 84 are arranged at the corresponding level of the respective driven wheels 70 to 76 so the respective belt 86 to 92 runs essentially parallel to the cover plate 32.

Hence each subframe is driven via its own belt drive 94 to 100 and these belt drives are coupled by all of the driven wheels 70 to 76 being seated on the central drive shaft 52 for joint rotation therewith.

Hence all of the subframes 5 are simultaneously rotatable relative to the supporting frame 4 by rotation of the subframe drive motor 66.

The cassette compartments 8c of the shelf units 8 can, for example, be brought into a position in which a robot 102 has access to them firstly by the supporting frame 4 being rotated by the supporting frame drive means 46 and secondly by the respective subframe 5 being rotated by the subframe drive motor 66, all of the subframes 5 always being rotated simultaneously.

For this purpose, the rotary position of the supporting frame 4 is detected by a sensor 104 and the rotary position of the subframes by a sensor 106 and reported to a control system 108 for controlling both the supporting frame drive means 46 and the subframe drive motor 66.

The control system 108 can be designed so as to first control rotation of the supporting frame 4 and subsequently rotation of the subframes 5. It is, however, particularly advantageous for the control system 108 to simultaneously control rotation of the supporting frame 4 and rotation of all of the subframes 5 in order to bring the required shelf unit 8 as quickly as possible into a position in which the robot 102 has access to it.

In contrast therewith, the shelf units 9 are easier to bring into their position in which the robot 102 has access to them because the supporting frame 4 on which the shelf units 9 are stationarily arranged merely has to be turned by the supporting frame drive motor 46.

It is particularly advantageous within the scope of the present invention for rough positioning of the supporting frame 4 and possibly the subframes 5 to be carried out by the control system with the aid of the sensors 104 and 106 when a certain cassette compartment 8c is to be brought into a position in which the robot 102 has access to it.

Exact positioning in the accessible position can then be additionally carried out with first positioning elements comprising, for example, a recess 110 fixedly arranged on the supporting frame 4 and a locking bar 112 which is arranged on the base 2 and can be pushed into and out of the recess 110 by a shifting device 114. The shifting device 114 is preferably designed so as to permit displacement of the locking bar parallel to the longitudinal axis of the central drive shaft 52.

The locking bar is preferably provided with drive-in inclines 118 at a front end 116 and the recess 110 likewise with drive-in inclines 120 on its side facing the locking bar 112 so that rough positioning of the supporting frame 4 by the control system 108 with the aid of the sensors 104 and 106 is sufficient and a transition to the exact positioning occurs as the locking bar 112 moves into the recess 110 and the drive-in inclines 118 and 120 slide over one another. In the position in which the locking bar 112 is driven fully into the recess 110, the recess and the locking bar fit together such that the supporting frame 4 is precisely aligned relative to the base 2.

For each position of the supporting frame 4 in which one of the cassette compartments 8c is in the position in which the robot 102 has access to it, there is preferably one recess 110, which, for example, in the embodiment illustrated in FIGS. 5 and 6, results in a total of eight recesses 110 at angular spacings of 45 degrees, as four subframes 5 and four further shelf units are held by the supporting frame 4 and these are arranged at the same angular spacings relative to one another.

In principle, there are as many recesses 110 in the revolving storage facility according to the invention as there are shelf units 8, 9 whose front faces 8a, 9a point to the outer side of the revolving tower storage facility.

Provision is also made for rough positioning of the subframes 5 by means of the control system 108 and the sensor 106, while exact positioning is likewise carried out by means of a recess 122 on the subframe 5 and a locking bar 124 which can be driven into this recess 122.

The locking bar 124 is likewise drivable by a shifting device 126 into the recess 122 and is preferably movable parallel to the central drive shaft 52.

It is advantageous for the exact positioning of the subframe 5 not to be carried out relative to the rotary frame 4 but, for reasons of precision, likewise relative to the base 2, i.e., the locking bar 124 is held with the shifting device 126 on the base 2.

In the same way as the locking bar 112, the locking bar 124 is provided with drive-in inclines 128 and the recess 122 with drive-in inclines 130 so that the transition from the rough positioning to the exact positioning likewise occurs as the locking bar 124 moves into the recess 122 and when the locking bar 124 is fully inserted in the recess 122, these two fit together.

In order to hold the locking bar 124 on the base 2, it is necessary to make an opening 132 in the bottom plate 30 of the supporting frame 4. In this case, the shifting device 126 is preferably held on the cover 16 of the base 2 and the recess 122 arranged on the bottom of the subframe 5.

In like manner, the recess 110 is preferably provided in the bottom plate 30 of the supporting frame 4 and the locking bar 112 with the shifting device 114 held on a side wall 12 or, for example, also on the cover of the base 2.

In the storage facility according to the invention, it is particularly advantageous for the shifting devices 114 and 126 to likewise be activated by the control system 108, in particular with a cycle in which the control system 108 first carries out rough positioning of the supporting frame 4 and possibly the subframe 5 and, after completion of the rough positioning, activates the shifting device 114 for exact positioning of the supporting frame 4 and the shifting device 126 for exact positioning of the subframe 5.

The number of recesses 122 arranged on the bottom of the subframe 5 depends on how many shelf units 8 this subframe comprises. In the case of three shelf units 8, as in FIG. 6, there are three recesses 122 arranged at an angular spacing of 120 degrees from one another. In the case of a larger number of shelf units, there are correspondingly more recesses.

The present disclosure relates to the subject matters disclosed in German applications No. P 38 44 303.1 of Dec. 30, 1988 and No. P 39 31 789.7 of Sept. 23, 1989, and European application No. 89122803.3 of Dec. 11, 1989, the entire specifications of which are incorporated herein by reference.

What is claimed is:

1. Revolving storage facility for data storage cassettes comprising:
   a base;
   a rotary unit including a supporting frame;
   said supporting frame being rotatable about an axis of rotation relative to said base;
   said rotary unit further including rotatable subframes mounted on said supporting frame for rotation about a subframe axis of rotation extending parallel to said axis of rotation;
   said rotatable subframes being arranged on said supporting frame around said axis of rotation and forming intermediate zones between each other;
   said rotatable subframes carrying shelf units with cassette compartments for said data storage cassettes at their outer periphery;
   said rotary unit further including stationary shelf units with cassette compartments for said data storage cassettes arranged at a peripheral area of said supporting frame and in said intermediate zones formed between said rotatable subframes.

2. Revolving storage facility as defined in claim 1, wherein each shelf unit has a front side and that said front sides of said shelf units facing an outer side of said revolving storage facility exhibit a substantially constant spacing from said axis of rotation of said supporting frame.

3. Revolving storage facility according to claim 1, wherein said shelf units mounted on said subframes and on said supporting frame have a front side which forms one plane.

4. Revolving storage facility according to claim 2, wherein said front sides which are facing an outer side of said revolving storage facility exhibit a substantially constant spacing from said axis of rotation of said supporting frame.

5. Revolving storage facility according to claim 1, wherein said shelf units comprise several horizontally extending rows of cassette compartments stacked on top of each other and being designed to accommodate cassettes standing on edge.

6. Revolving storage facility as defined in claim 1, wherein said axis of rotation extends vertically upwardly from said base.

7. Revolving storage facility as defined in claim 1, wherein subframe axes of rotation are arranged substantially vertically.

8. Revolving storage facility as defined in claim 1, wherein said subframes axes of rotation are arranged equidistantly from said axis of rotation of said supporting frame.

9. Revolving storage facility as defined in claim 1, wherein said subframe axes of rotation are arranged at the same angular spacing around said axis of rotation of said supporting frame.

10. Revolving storage facility as defined in claim 1, wherein each subframe carries several rectangular shelf units arranged at an outer circumference thereof.

11. Revolving storage facility as defined in claim 10, wherein said subframes with said shelf units mounted thereon form cylindrical configurations.

12. Revolving storage facility as defined in claim 10, wherein said subframes with said shelf units mounted thereon have an outer circumferential surface comprising many flat sides.

13. Revolving storage facility for data storage cassettes comprising:
a base;
a rotary unit including a supporting frame, said supporting frame being rotatable about an axis of rotation relative to said base;
said rotary unit further including rotatable subframes mounted on said supporting frame for rotation about a subframe axis of rotation;
said rotatable subframes carrying shelf units at their outer periphery;
a supporting frame drive means having a supporting frame drive motor arranged non-rotatingly relative to said base;
a subframe drive means;
a control system detecting the rotary positions of the supporting frame and the subframes and for controlling said supporting frame drive means and said subframe drive means for determining the position of one selected individual shelf unit relative to an externally located fixed point and for controlling rotation of said supporting frame and said subframe in order to place a selected cassette compartment in a position in which a robot has access to it;
said control system being designed for rotating said subframe with said selected individual shelf unit during rotation of said supporting frame in order to position said selected cassette compartment.

14. Revolving storage facility as defined in claim 13, wherein several subframes are drivable by a common subframe drive means.

15. Revolving storage facility as defined in claim 14, wherein all subframes are drivable by a common subframe drive means.

16. Revolving storage facility as defined in claim 13, wherein said subframe drive means comprises a subframe drive motor which is arranged non-rotatingly relative to said base.

17. Revolving storage facility as defined in claim 16, wherein said subframe drive motor is arranged on said base.

18. Revolving storage facility as defined in claim 13, wherein said subframe drive means comprises a central shaft which is arranged coaxially with said axis of rotation of said supporting frame.

19. Revolving storage facility as defined in claim 18, wherein said subframe drive motor drives said central shaft via a belt drive.

20. Revolving storage facility as defined in claim 18, wherein said subframes are driven from said central shaft.

21. Revolving storage facility as defined in claim 20, wherein each subframe comprises a subframe drive shaft which is coaxial with said subframe axis and is driven by said central shaft.

22. Revolving storage facility as defined in claim 21, wherein said central shaft drives each subframe drive shaft via a belt drive.

23. Revolving storage facility as defined in claim 22, wherein each belt drive is arranged in a plane perpendicular to said axis of rotation of said supporting frame.

24. Revolving storage facility as defined in claim 22, wherein said belt drives are arranged between said central shaft and said subframe drive shaft on the side of said supporting frame opposite said base.

25. Revolving storage facility as defined in claim 18, wherein said supporting frame comprises a hollow shaft through which said central shaft extends.

26. Revolving storage facility as defined in claim 25, wherein said hollow shaft is mounted for rotation on said base.

27. Revolving storage facility as defined in claim 26, wherein said hollow shaft is drive via a belt drive included in said supporting frame drive means.

28. Revolving storage facility as defined in claim 13, wherein said base comprises a self-supporting housing.

29. Revolving storage facility as defined in claim 13, wherein a rough positioning of said supporting frame and said subframes is carried out with said control system.

30. Revolving storage facility as defined in claim 29, wherein means comprising first positioning elements on said supporting frame and on said base are provided for precise positioning of said supporting frame in specified angular positions relative to said base.

31. Revolving storage facility as defined in claim 29, wherein means comprising second positioning elements on a subframe and on said base are provided for precise positioning of said subframe in specified angular positions relative to said base.

33. Revolving storage facility as defined in claim 30, wherein said means for precise positioning operate mechanically.

33. Revolving storage facility as defined in claim 32, wherein said positioning elements comprise a locking bar which engages a recess.

34. Revolving storage facility as defined in claim 33, wherein said locking bar or said recess is provided with drive-in inclines.

35. Revolving storage facility as defined in claim 33, wherein said locking bar and said recess fit together.

36. Revolving storage facility for data storage cassettes comprising:
   a base;
   a rotary unit including a supporting frame;
   said supporting frame being rotatable about an axis of rotation relative to said base;
   said rotary unit further including rotatable subframes mounted on said supporting frame for rotation about a subframe axis of rotation extending parallel to said axis of rotation;
   said rotatable subframes being arranged on said supporting frame around said axis of rotation and forming intermediate zones between each other;
   said rotatable subframes carrying shelf units with cassette compartments for said data storage cassettes at their outer periphery;
   said rotary unit further including stationary shelf units with cassette compartments for said data storage cassettes arranged at a peripheral area of said supporting frame and in said intermediate zones formed between said rotatable subframes; and
   control means for positioning each cassette compartment by rotating said rotary unit and/or said rotatable subframes in a defined position in which a robot has access to it.

* * * * *